US012737673B2

(12) United States Patent
Singh et al.

(10) Patent No.: US 12,737,673 B2
(45) Date of Patent: Sep. 15, 2026

(54) METHOD AND SYSTEM FOR ADAPTIVE LEARNING OF MODELS IN MANUFACTURING SYSTEMS

(71) Applicant: Tata Consultancy Services Limited, Mumbai (IN)

(72) Inventors: Kuldeep Singh, Pune (IN); Sri Harsha Nistala, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1039 days.

(21) Appl. No.: 17/743,572

(22) Filed: May 13, 2022

(65) Prior Publication Data

US 2022/0405638 A1 Dec. 22, 2022

(30) Foreign Application Priority Data

Jun. 11, 2021 (IN) ............................ 202121026063

(51) Int. Cl.
*G05B 17/02* (2006.01)
*C21B 5/00* (2006.01)
(Continued)

(52) U.S. Cl.
CPC ............ *G06N 20/00* (2019.01); *C21B 5/006* (2013.01); *C22B 1/16* (2013.01); *G05B 13/0265* (2013.01)

(58) Field of Classification Search
CPC .......... G06F 30/25; G06F 30/27; G06F 30/28; G06N 20/00; G05B 13/0265; G05B 17/02; C22B 1/16; C21B 5/006
See application file for complete search history.

(56) References Cited

U.S. PATENT DOCUMENTS 10,394,229 B2 * 8/2019 Lee .......................... G06N 5/04
2016/0021376 A1 1/2016 Andreopoulos et al.
(Continued)

FOREIGN PATENT DOCUMENTS

WO WO-2004099942 A2 * 11/2004 ............ G06V 40/25

OTHER PUBLICATIONS

Singh, K., Vakkantham, P., Nistala, S.H. et al. Multi-objective Optimization of Integrated Iron Ore Sintering Process Using Machine Learning and Evolutionary Algorithms. Trans Indian Inst Met 73, 2033-2039 (2020). https://doi.org/10.1007/s12666-020-01920-0 (Year: 2020).*

(Continued)

*Primary Examiner* — Ryan F Pitaro
*Assistant Examiner* — Jay Michael White
(74) *Attorney, Agent, or Firm* — Finnegan, Henderson, Farabow, Garrett & Dunner, LLP

(57) ABSTRACT

In applications such as adaptive learning of physics-based and data-driven models associated with industrial plants, the models are corrected periodically by taking into consideration the dynamic changes occurring in plant conditions and related data. However, accuracy of adaptive learning depends on accuracy of ground truth data being used as reference data. The disclosure herein generally relates to data preprocessing, and, more particularly, to a method and system for ground truth profile correction and instance selection. The system performs a ground truth profile correction for ground truth profiles having a Profile Deviation Index (PDI) value exceeding a threshold of distortion, to reduce the PDI value, and in turn reduce the distortion in the ground truth profiles. Further, the system performs a data instance selection to identify and remove outliers, and the data that remains after the data instance selection may be (Continued)

then used for applications such as model generation or retuning.

20 Claims, 10 Drawing Sheets

(51) Int. Cl.

| | |
|---|---|
| ***C22B 1/16*** | (2006.01) |
| ***G05B 13/02*** | (2006.01) |
| ***G06N 20/00*** | (2019.01) |

(56) References Cited

U.S. PATENT DOCUMENTS

| | | | | |
|---|---|---|---|---|
| 2017/0169355 | A1 | 6/2017 | Boyer et al. | |
| 2018/0107450 | A1* | 4/2018 | Runkana | G06F 7/08 |
| 2018/0330300 | A1* | 11/2018 | Runkana | G05B 15/02 |
| 2019/0361409 | A1* | 11/2019 | Bettinger | G05B 13/0265 |
| 2022/0382263 | A1* | 12/2022 | Zhao | G06Q 10/0637 |

OTHER PUBLICATIONS

Songzhu Zheng, Pengxiang Wu, Aman Goswami, Mayank Goswami, Dimitris Metaxas, and Chao Chen. 2020. Error-bounded correction of noisy labels. In Proceedings of the 37th International Conference on Machine Learning (ICML'20), vol. 119. JMLR.org, Article 1061, 11447-11457. (Year: 2020).*

Silversides, Katherine & Melkumyan, Arman. (2016). A Dynamic Time Warping based covariance function for Gaussian Processes signature identification. Computers & Geosciences. (Year: 2016).*

Thoen, Edwin. "Binning Outliers in a Histogram". That's So Random. https://edwinth.github.io/blog/outlier-bin/ (Year: 2017).*

Suresha HP. "Sampling Techniques—Statistical approach in Machine learning". https://medium.com/analytics-vidhya/sampling-statistical-approach-in-machine-learning-4903c40ebf86 (Year: 2021).*

Cui, Zijun & Zhang, Yong & Ji, Qiang. (2020). Label Error Correction and Generation through Label Relationships. Proceedings of the AAAI Conference on Artificial Intelligence. 34. 3693-3700. 10.1609/aaai.v34i04.5778. (Year: 2020).*

Nicholson, Bryce & Sheng, Victor & Zhang, Jing & Wang, Zhiheng. (2015). Label Noise Correction Methods. 10.1109/DSAA.2015.7344791. (Year: 2015).*

Peppanen, Jouni & Zhang, Xiaochen & Grijalva, Santiago & Reno, Matthew. (2016). Handling Bad or Missing Smart Meter Data through Advanced Data Imputation. 10.1109/ISGT.2016.7781213. (Year: 2016).*

M. Reihanian, S.R. Asadullahpour, S. Hajarpour, Kh. Gheisari, Application of neural network and genetic algorithm to powder metallurgy of pure iron, Materials & Design, vol. 32, Issue 6, 2011, pp. 3183-3188 (Year: 2011).*

* cited by examiner

METHOD AND SYSTEM FOR ADAPTIVE LEARNING OF MODELS IN MANUFACTURING SYSTEMS

PRIORITY CLAIM

This U.S. patent application claims priority under 35 U.S.C. § 119 to: Indian Patent Application No. 202121026063, filed on 11 Jun. 2021. The entire contents of the aforementioned application are incorporated herein by reference.

TECHNICAL FIELD

The disclosure herein generally relates to adaptive learning of models, and, more particularly, to a method and system for correcting distorted ground truth profile and selecting instances for accurate retuning of data-driven and physics-based models in manufacturing systems.

BACKGROUND

Data-driven and physics-based models of manufacturing and process plants and equipment are representative of the actual physical and chemical processes taking place in the plant. Such models can be used for building digital twins of the plant or equipment that can emulate the working of the plant/equipment. Accuracy and quality of outputs generated by such models depend directly on the quality of data used to train and/or tune the models.

When the trained models are used for predictions using real-time data from the plant or equipment, their performance deteriorates with time due to the changes in the operating regime of the plant or equipment. The changes in the operating regime may occur due to several factors such as but not limited to changes in feed materials, wear and tear of process equipment, replacement/maintenance of process equipment, changes in operating conditions, and changes in control or operating strategy. If the performance of the models degrades significantly, the models need to be corrected in order to adapt to the newer operating regime.

Adaptive learning or self-learning of data-driven models and physics-based models is to be performed to update the models. Many state-of-the-art adaptive learning processes are available for this purpose, including the methods disclosed in patent applications IN201921019548 and IN201921026929. The state-of-the-art approaches rely on ground truth/measured information with respect to various processes/equipment, in order to re-train/retune and validate the models. Hence, correctness/accuracy of the ground truth data is of high importance.

However, the ground truth in case of manufacturing and process plants is not always accurate. For example, in case of industrial sintering plants, a 2D physics based model of the sintering process is tuned and validated using measured wind box temperature profiles as the ground truth. These are the temperature profiles of flue gas emanating from the sinter strand and flowing through the windboxes below the strand. Key performance indicators (KPIs) of the sinter plant such as BTP (Burn through point), maximum windbox temperature and flame front speed are derived from the wind box temperature profiles. The KPIs provide crucial real-time information and process visibility to the operators to help them determine the next set of suitable actions for operating the plant optimally.

Often, due to the wear and tear or inadequate maintenance of the sinter strand, the wind box temperature profiles are corrupted due to ingress of air into the windboxes. Further, there is no measure of air ingression due to the unavailability of appropriate sensors, dynamic nature of air ingression and unknown location of leakage. This dynamic and complex nature of mixing of the air with the flue gas from the sintering strand leads to noisy and corrupt ground truth data for self-learning of the physics-based model. The resultant re-tuned model will be inadequate due to learning on noisy ground truth and its accuracy will be low. Such models do not learn the underlying physical information of the process in the new operating regime effectively. As a result, the quality of the predictions generated by such models is inadequate.

SUMMARY

Embodiments of the present disclosure present technological improvements as solutions to one or more of the above-mentioned technical problems recognized by the inventors in conventional systems. For example, in one embodiment, a processor-implemented method of adaptive learning of models for a manufacturing system is provided. Initially, a plurality of measured ground truth profiles and operating data are collected as input data, via one or more hardware processors, from one or more databases at a pre-determined frequency, wherein each of the plurality of the measured ground truth profiles comprises information on one or more manufacturing system parameters and one or more variables corresponding to each of the one or more manufacturing system parameters. Further, the input data is pre-processed, via the one or more hardware processors, wherein the pre-processing of the input data comprises conditioning the input data to satisfy one or more pre-defined data quality requirements. Further, simulated data based on the pre-processed data and using at least one soft sensor is obtained is obtained via the one or more hardware processors, wherein the at least one soft-sensor comprises a physics-based soft sensor and a data-driven soft sensor, wherein the simulated data is integrated with pre-processed data to obtain integrated data. Further, a Profile Deviation Index (PDI) value for each of the plurality of the measured ground truth profiles in the integrated data is obtained via the one or more hardware processors, wherein the PDI value represents a quantified distortion in each of the plurality of the measured ground truth profiles. The PDI value of each of the plurality of the measured ground truth profiles is then compared with a threshold of distortion, via the one or more hardware processors, wherein the PDI value exceeding the threshold of distortion for any of the plurality of the measured ground truth profiles indicates inaccuracy in the measured ground truth profile. Further, a ground truth profile correction is performed for all measured ground truth profiles from among the plurality of the measured ground truth profiles for which the PDI value exceeds the threshold of distortion, via the one or more hardware processors, wherein the ground truth profile correction is iteratively performed till the PDI value is below the threshold of distortion. Further, an instance selection is performed via the one or more hardware processors, wherein performing the instance selection comprises selecting a plurality of instances of data from among the plurality of the measured ground truth profiles, after performing the ground truth profile correction, wherein each of the plurality of instances of data is a subset of the plurality of the measured ground truth profiles. Further, the plurality of selected instances and the integrated data are used to retune at least one of a data-driven model and physics-based model.

In another aspect, a system for adaptive learning of models for manufacturing systems is provided. The system includes a memory storing a plurality of executable instructions, a communication interface, and one or more hardware processors operatively coupled to the memory via the communication interface. The one or more hardware processors are configured by the plurality of executable instructions to initially collect a plurality of measured ground truth profiles and operating data as input data, from one or more databases at a pre-determined frequency, wherein each of the plurality of the measured ground truth profiles comprises information on one or more manufacturing system parameters and one or more variables corresponding to each of the one or more manufacturing system parameters. Further, the input data is pre-processed, by the system, wherein the pre-processing of the input data comprises conditioning the input data to satisfy one or more pre-defined data quality requirements. Further, the system obtains a simulated data based on the pre-processed data and using at least one soft sensor, wherein the at least one soft-sensor comprises a physics-based soft sensor and a data-driven soft sensor, wherein the simulated data is integrated with pre-processed data to obtain integrated data. Further, a Profile Deviation Index (PDI) value for each of the plurality of the measured ground truth profiles in the integrated data is obtained, wherein the PDI value represents a quantified distortion in each of the plurality of the measured ground truth profiles. The PDI value of each of the plurality of the measured ground truth profiles is then compared with a threshold of distortion, wherein the PDI value exceeding the threshold of distortion for any of the plurality of the measured ground truth profiles indicates inaccuracy in the measured ground truth profile. Further, a ground truth profile correction is performed for all measured ground truth profiles from among the plurality of the measured ground truth profiles for which the PDI value exceeds the threshold of distortion, wherein the ground truth profile correction is iteratively performed till the PDI value is below the threshold of distortion. Further, an instance selection is performed by the system, wherein performing the instance selection comprises selecting a plurality of instances of data from among the plurality of the measured ground truth profiles, after performing the ground truth profile correction, wherein each of the plurality of instances of data is a subset of the plurality of the measured ground truth profiles. Further, the plurality of selected instances and the integrated data are used to retune at least one of a data-driven model and physics-based model.

In yet another aspect, a non-transitory computer readable medium for adaptive learning of models for manufacturing systems is provided. The non-transitory computer readable includes a plurality of instructions, which when executed, cause one or more hardware processors to perform the adaptive learning of models as elaborated below. Initially, a plurality of measured ground truth profiles and operating data are collected as input data, via one or more hardware processors, from one or more databases at a pre-determined frequency, wherein each of the plurality of the measured ground truth profiles comprises information on one or more manufacturing system parameters and one or more variables corresponding to each of the one or more manufacturing system parameters. Further, the input data is pre-processed, via the one or more hardware processors, wherein the pre-processing of the input data comprises conditioning the input data to satisfy one or more pre-defined data quality requirements. Further, simulated data based on the pre-processed data and using at least one soft sensor is obtained is obtained via the one or more hardware processors, wherein the at least one soft-sensor comprises a physics-based soft sensor and a data-driven soft sensor, wherein the simulated data is integrated with pre-processed data to obtain integrated data. Further, a Profile Deviation Index (PDI) value for each of the plurality of the measured ground truth profiles in the integrated data is obtained via the one or more hardware processors, wherein the PDI value represents a quantified distortion in each of the plurality of the measured ground truth profiles. The PDI value of each of the plurality of the measured ground truth profiles is then compared with a threshold of distortion, via the one or more hardware processors, wherein the PDI value exceeding the threshold of distortion for any of the plurality of the measured ground truth profiles indicates inaccuracy in the measured ground truth profile. Further, a ground truth profile correction is performed for all measured ground truth profiles from among the plurality of the measured ground truth profiles for which the PDI value exceeds the threshold of distortion, via the one or more hardware processors, wherein the ground truth profile correction is iteratively performed till the PDI value is below the threshold of distortion. Further, an instance selection is performed via the one or more hardware processors, wherein performing the instance selection comprises selecting a plurality of instances of data from among the plurality of the measured ground truth profiles, after performing the ground truth profile correction, wherein each of the plurality of instances of data is a subset of the plurality of the measured ground truth profiles. Further, the plurality of selected instances and the integrated data are used to retune at least one of a data-driven model and physics-based model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
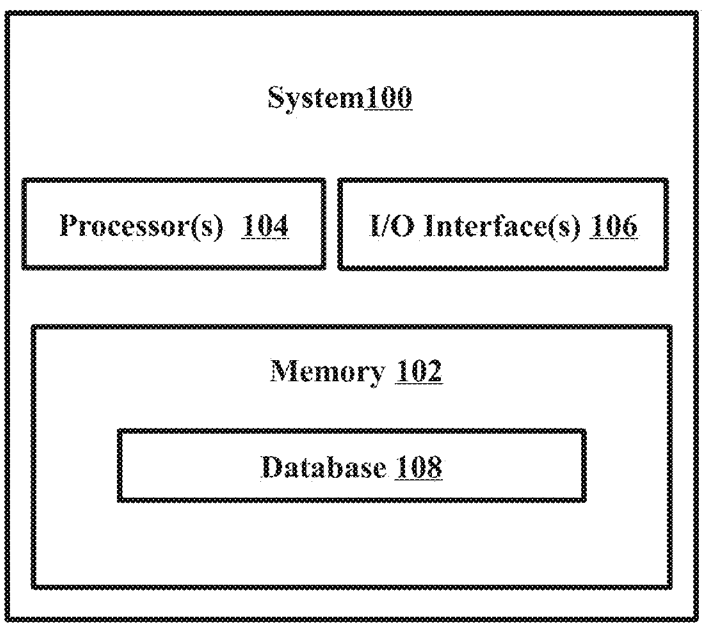
FIG. 1 illustrates an exemplary system for ground truth profile correction and instance selection, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 8B, where similar reference characters denote corresponding features consistently throughout the figures, there are shown preferred embodiments and these embodiments are described in the context of the following exemplary system and/or method.

FIG. 1 illustrates an exemplary system for ground truth profile correction and instance selection, according to some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores all data associated with the ground truth profile correction and the instance selection being performed by the system 100. The ground truth profile correction and the instance selection together contribute to adaptive learning of models. For example, various measured ground truth profiles fed as input to the system 100 may be stored in the database. Further, the corrected ground truth profiles generated and all or selected intermediate data generated during the step of determining noise in any of the ground truth profiles and while performing the ground truth profile correction may be stored in the database, to facilitate future reference and access as needed. The plurality of instructions that cause the one or more hardware processors 104 to perform the ground truth profile correction and instance selection also are stored in the database. In an embodiment, the database 108 may be external (not shown) to the system 100 and is coupled to the system 100 via the I/O interface 106. Functions of the components of the system 100 are explained in conjunction with FIG. 2 through FIG. 4.

Figure 2A:
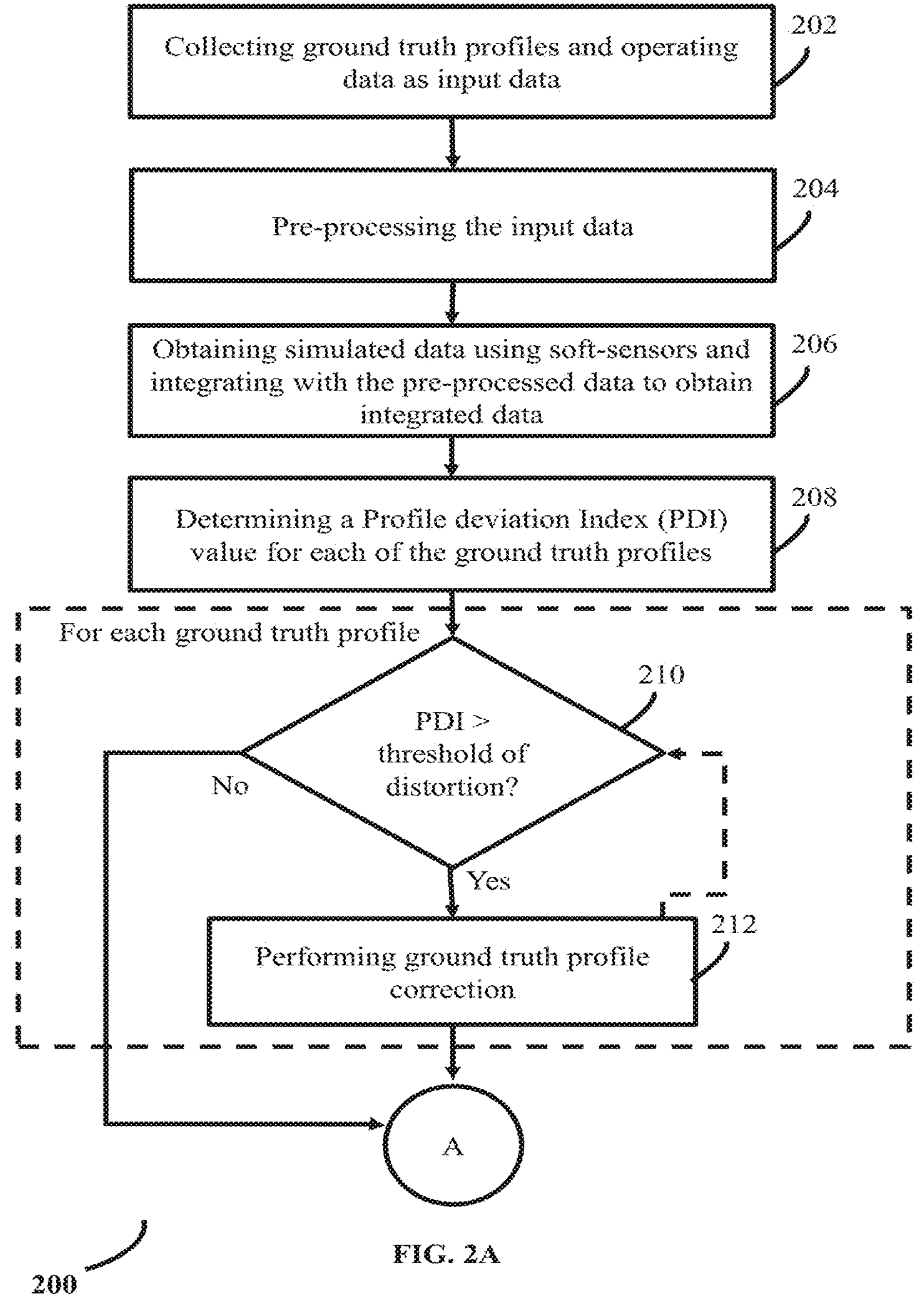
FIGS. 2A and 2B (collectively referred to as FIG. 2) is a flow diagram depicting steps involved in the process of ground truth profile correction and instance selection, by the system of FIG. 1, according to some embodiments of the present disclosure.
Figure 2B:
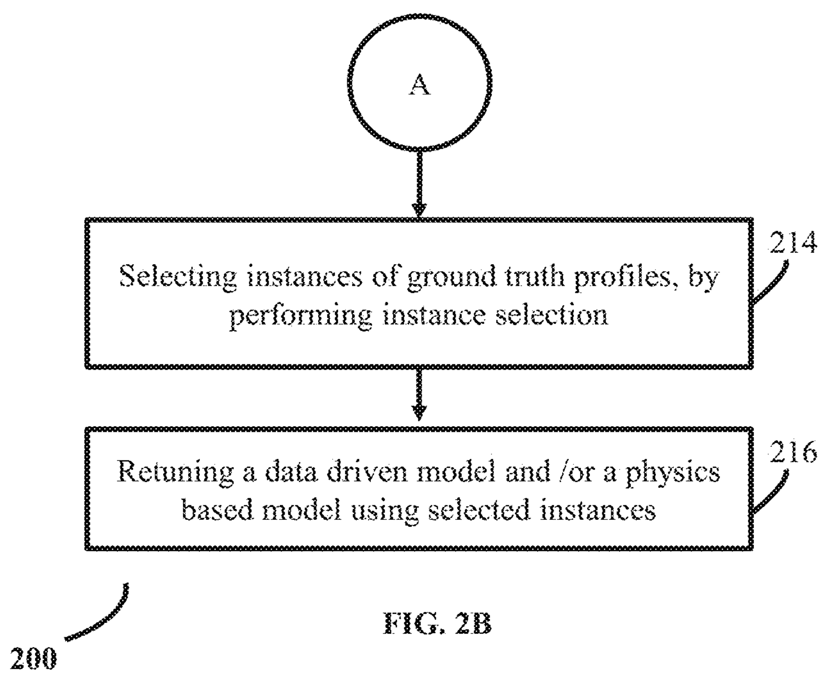

FIGS. 2A and 2B (collectively referred to as FIG. 2) is a flow diagram depicting steps involved in the process of ground truth profile correction and instance selection, by the system of FIG. 1, according to some embodiments of the present disclosure.

The term 'manufacturing system' may cover plants of different types like a continuous process plant or a discrete/batch manufacturing plant or a semi continuous plant. For example, the plant may be a steel plant, a petroleum refinery, an automobile manufacturing plant, a power plant, a drug and pharmaceutical plant, a medical devices plant, etc. The plant comprises of multiple units or equipment and many industrial processes are being carried out in the plant, by one or more of these units, at any instance when the plant is operational. For example, the unit or equipment may be valves, compressors, blowers, pumps, steam turbines, gas turbines, heat exchangers, chemical reactors, bio-reactors, boilers and automobile engines.

In this method of ground truth profile correction, at step 202, a plurality of measured ground truth profiles and operating data are collected as input data by the system 100, via the one or more hardware processors 104. In various embodiments, each of the individual plant units and the plant as a whole are expected to perform/function at specific defined performance levels, for example, at different capacities such as 80% of design capacity. As a result, the ground truth profiles may be defined at the individual unit level and/or at the plant level. So, the ground truth profiles and the operating data may correspond to the individual units or the whole plant in different embodiments. The system 100 may collect the ground truth profiles and the operating data from one or more databases at a pre-determined frequency. Each of the plurality of the ground truth profiles may include at least one manufacturing system parameter and one or more corresponding variables. The manufacturing system parameter and one or more corresponding variables may contain actual measurements, laboratory test results and so on, with respect to different factors/parameters associated with the process/plant being monitored. For example, when the system 100 is deployed to monitor performance of a coal-fired boiler, the ground truth profile may contain information on manufacturing system parameters such as but not limited to temperature, pressure, and so on, and the variables in this context may refer to factors that affect each of these manufacturing system parameters, for example, types and amounts of raw materials being used in the plant, different characteristics (such as composition, size distribution, etc.) of each of the raw materials used, plant operating conditions (such as temperature and pressures of raw materials, number of burners in use, valve openings, etc.) and so on.

At step 204, the system 100 pre-processes the input data, via the one or more hardware processors. The pre-processing of the input data involves conditioning the input data to satisfy one or more pre-defined data quality requirements. Any appropriate data processing method can be used for conditioning the input data. Some of the steps that may be executed for conditioning the data are, but not limited to, a) identification and removal of outliers, b) imputation of missing data, and c) synchronization and integration of a plurality of variables from one or more databases.

It may not be possible to measure some of the parameters in the plant using physical sensors due to complex architecture of the plant or other physical barriers. For example, temperature in the firing zone of a furnace may have an impact on the efficiency of the furnace but it is not possible to measure the same because the firing could be accessible or the temperature may be too high (>1500° C.) for thermocouples to sustain. In order to address this issue, at step 206, the system 100 obtains simulated data, based on the pre-processed data and using at least one soft sensor. Soft sensors are parameters that may have an impact on the key performance parameters of the plant but are not measured or cannot be measured using physical sensors. The at least one soft-sensor may include a physics-based soft sensor and/or a data-driven soft sensor. The system 100 then integrates the simulated data with the pre-processed data to obtain integrated data.

Further, at step 208, a Profile Deviation Index (PDI) value is determined for each of the plurality of the measured ground truth profiles in the integrated data, via the one or more hardware processors. The PDI value may be unique to each measured ground truth profile, and represents a quantified distortion in each of the plurality of the measured ground truth profiles, in comparison with a corresponding signature profile. The PDI value is determined as below:

The system 100 calculates a similarity metric between the signature profile and measured profile, termed $D_{sm}$ The system 100 then calculates an error metric between the signature profile and measured profile, termed $D_{em}$ Further, the system 100 determines the PDI value as:

$$PDI\ \text{value} = D_{sm} * \log(D_{em}) \quad (1)$$

The similarity metric could be one of cosine similarity or dynamic time warping (DTW) distance and the error metric could be one of mean square error (MSE), root mean square error (RMSE) or mean absolute percentage error (MAPE).

The PDI value is calculated for each of the measured ground truth profiles, in comparison with the corresponding signature profile. The signature profiles corresponding to the plurality of measured ground truth profiles may be stored in a signature profile database, with each of the signature profiles mapped with the operating conditions of the process or equipment (current operating capacity, raw materials, operating variables, etc.) for which the ground truth profiles are measured. The signature profile for a plurality of ground truth profiles is selected based on the current operating conditions of the process or equipment. The PDI value of each of the measured ground truth profiles may be displayed to an operator, using an appropriate interface provided by the I/O interface(s) 106.

Further, at step 210, the system 100 compares the determined PDI value of each of the measured ground truth profiles with a threshold of distortion. The threshold of distortion may be a pre-configured value, and may be changed as per requirements by a user, using a suitable interface. The determined PDI value exceeding the threshold of distortion for a measured ground truth profile indicates presence of noise/distortion in the measured ground truth profile.

Figure 3:
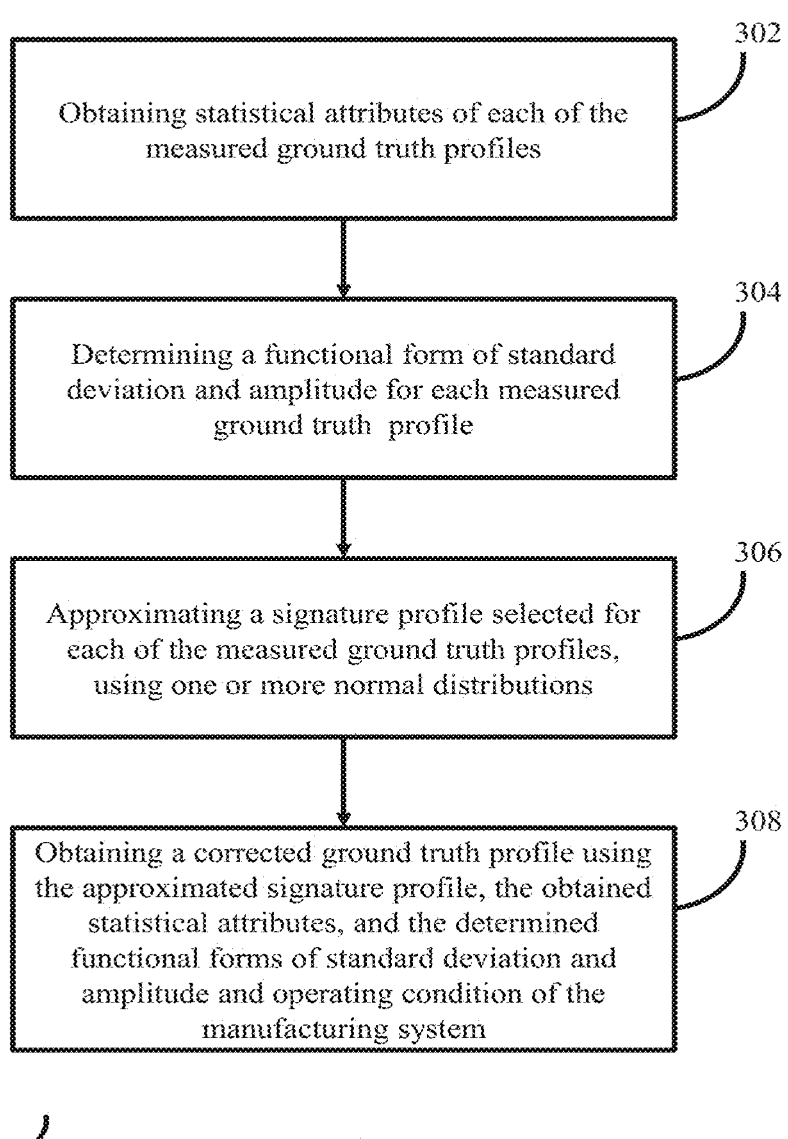
FIG. 3 is a flow diagram depicting steps involved in the process of obtaining a corrected ground truth profile corresponding to each measured ground truth profile, by the system of FIG. 1, in accordance with some embodiments of the present disclosure.

At step 212, the system 100 performs a ground truth profile correction, for all the measured ground truth profiles for which the determined PDI values are identified as exceeding the threshold of distortion. Various steps in the ground truth profile correction are depicted in FIG. 3.

At step 302, the system 100 obtains a plurality of statistical attributes of each of the plurality of the measured ground truth profiles. The statistical attributes may be mean (peak), standard deviation and so on. For example, the mean and standard deviation of the measured ground truth profile are obtained considering that the selected signature profile follows some variant of single normal distribution (e.g. fat tail normal distribution) or approximated using multiple 'n' normal distributions. Further, at step 304, the system 100 determines a functional form of standard deviation and amplitude for each of the plurality of the measured ground truth profiles, based on an underlying physical characteristic of the manufacturing system parameter. The underlying physical characteristics may refer to the physico-chemical changes which occur during the furnace operation. Such variations are captured using the functional form of standard deviation and amplitude. For example, during iron ore sintering operation the physico-chemical properties (heat capacity, conductivity etc.) of green mix varies throughout the sintering strand and this affects the windbox profiles beneath. Such variations are captured using the function form of standard deviation and amplitude for better fitting of the signature profile. The functional form can be determined as:

$$f_\sigma(x) = \sigma\left(\frac{\lambda_\sigma}{e^{-\alpha(x-\mu)}+1}+1\right) \,\&\, f_K(x) = K\left(\frac{\lambda_K}{e^{-\alpha(x-\mu)}+1}+1\right) \quad (2)$$

Where, $f_\sigma(x)$ and $f_K(x)$ represent the functional forms of standard deviation and maximum amplitude respectively. The parameter $\alpha$ is rate parameter and $\lambda_\sigma$, $\lambda_K$ are the transition factor.

Further at step 306, the system 100 approximates a selected signature profile corresponding to each of the plurality of the measured ground truth profiles, using one or more normal distributions. The functional form of the approximated signature profile may be:

$$f(x) = \sum_{i=1}^{n} \mathcal{N}(\mu_i, \sigma_i^2) \quad (3)$$

$$\mathcal{N}(\mu_i, \sigma_i^2) = B_i + \frac{K_i(x)}{\sigma_i(x)\sqrt{2\pi}} e^{\frac{-1}{2}\left(\frac{x-\mu_i}{\sigma_i(x)}\right)^2})$$

Where, a is standard deviation

B is bias

μ Is mean measured form the data and

K is the maximum amplitude.

Further, at step 308, the system 100 obtains a corrected ground truth profile corresponding to the measured ground truth profile being processed, by using the approximated signature profile, the obtained statistical attributes, the determined functional forms of standard deviation and amplitude, and information on the operating conditions of the plant. A statistical approach may be used at this stage to correct the measured ground truth profiles that have been identified as having PDI value exceeding the threshold of distortion. The statistical approach may use a combination of underlying physics of the plant and the measured ground truth profiles as inputs. The previously calculated statistical attribute and functional form of the standard deviation and amplitude is used in fitting the obtained approximated signature profile for a given operating condition, thus obtaining the corrected ground truth profile. Further, the system 100 determines PDI value for the corrected ground truth profile in comparison with its corresponding signature profile, and verifies that the determined PDI is below the threshold of distortion. As the approximation and fitting updates the measured ground truth profile to match the signature profile, the PDI value decreases with every iteration of the profile correction. Hence, the steps 208 to 212 may be iterated till the determine PDI value is below the threshold of distortion.

The corrected ground truth profiles, and the measured ground truth profiles for which the PDI values are below the threshold of distortion at step 210 may be then stored in the database 108. After the ground truth profile correction, all of the plurality of ground truth profiles (containing original as well as corrected ground truth profiles) have PDI values below the threshold of PDI.

Figure 4:
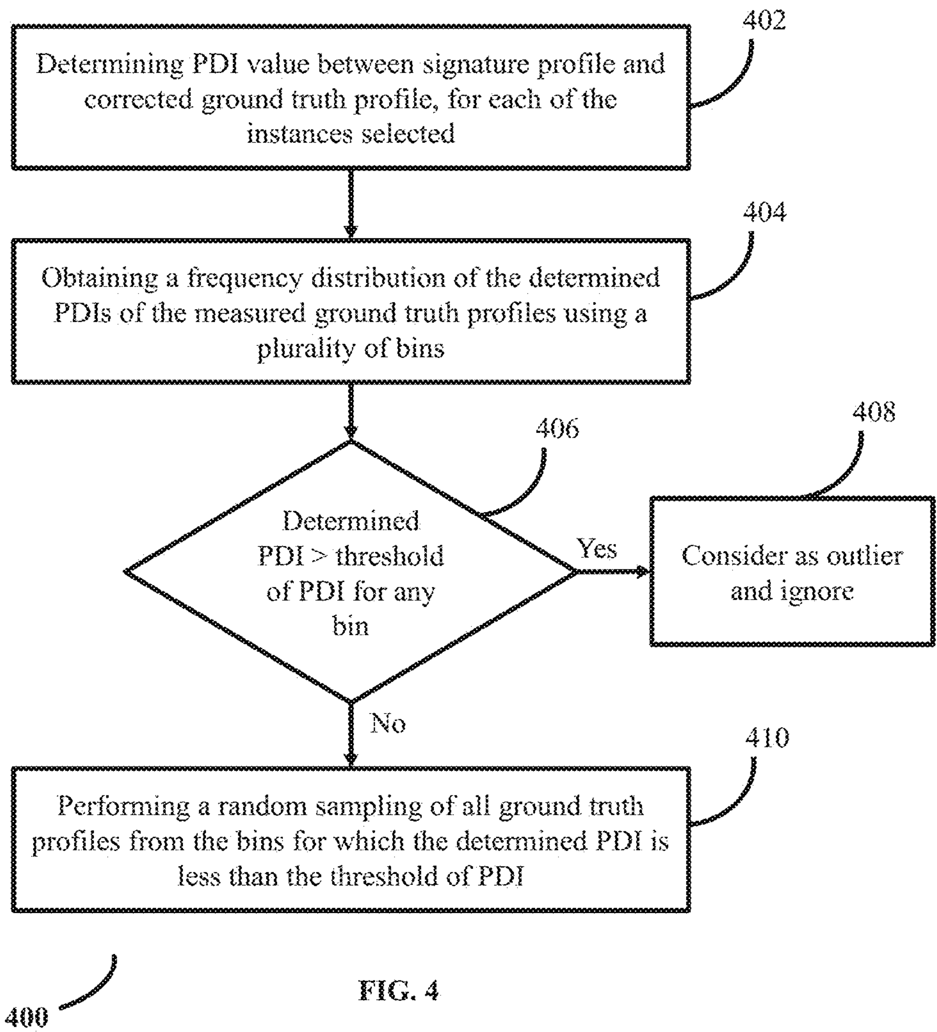
FIG. 4 is a flow diagram depicting steps involved in the process of instance selection being performed by the system of FIG. 1, according to some embodiments of the present disclosure.

Further, at step 214, the system 100 selects instances of the measured ground truth profiles and the corrected ground truth profiles (having PDI value below the threshold of distortion) by performing an instance selection via the one or more hardware processors. The instance selection involves selecting a subset of the measured ground truth profiles and the corrected ground truth profiles, by executing the following steps as depicted in FIG. 4. At step 402 of the method 400 depicted in FIG. 4, the system 100 determines value of PDI between each of the ground truth profiles (which includes the measured and/or corrected ground truth profiles) and corresponding signature profile, for each of the plurality of instances. In an embodiment, for the ground truth profiles that did not require the profile correction, the PDI values obtained at step 208 may be reused instead of recalculating at step 402. The PDI value may be determined by using equation (1). Further, at step 404, the system 100 obtains a frequency distribution of the determined PDIs using a plurality of bins. The frequency distribution indicates the percentage of the ground truth profiles lying in each bin for an original dataset.

Further, at step 406, the system 100 compares the determined PDI of each combination of the ground truth profile and corresponding signature profile, with a pre-determined threshold of PDI. The determined PDI value exceeding the threshold of PDI for any combination of the ground truth profile and corresponding signature profile in any bin is categorized as outlier ground truth profile (alternately referred to as 'outliers'), and is not considered for selection. Not considering the outliers results in improved data quality, and reduces the amount of data being processed which reduces storage space requirements and system overhead in processing the data. Further at step 408, the system 100 performs a random sampling of the ground truth profiles from each of the plurality of bins (that have been identified as not containing outliers) in the same proportion as that of the obtained frequency distribution of the original ground truth profiles across the plurality of bins. The percentage of ground truth profiles to be selected is pre-determined (e.g. 10%) for a given manufacturing system and may be modified by the user via an approximate user interface. The ground truth profiles selected by virtue of the sampling may be then used for applications such as but not limited to retuning (216) physics based models and retuning the data-driven models using machine learning. The capability to dynamically perform the ground truth profile correction and select instances for retuning of the physics based models and the data-driven models results in the adaptive learning of models in the manufacturing systems.

Use Case: Iron Ore Sintering Process

Sinter Plant Process Description

Figure 6:
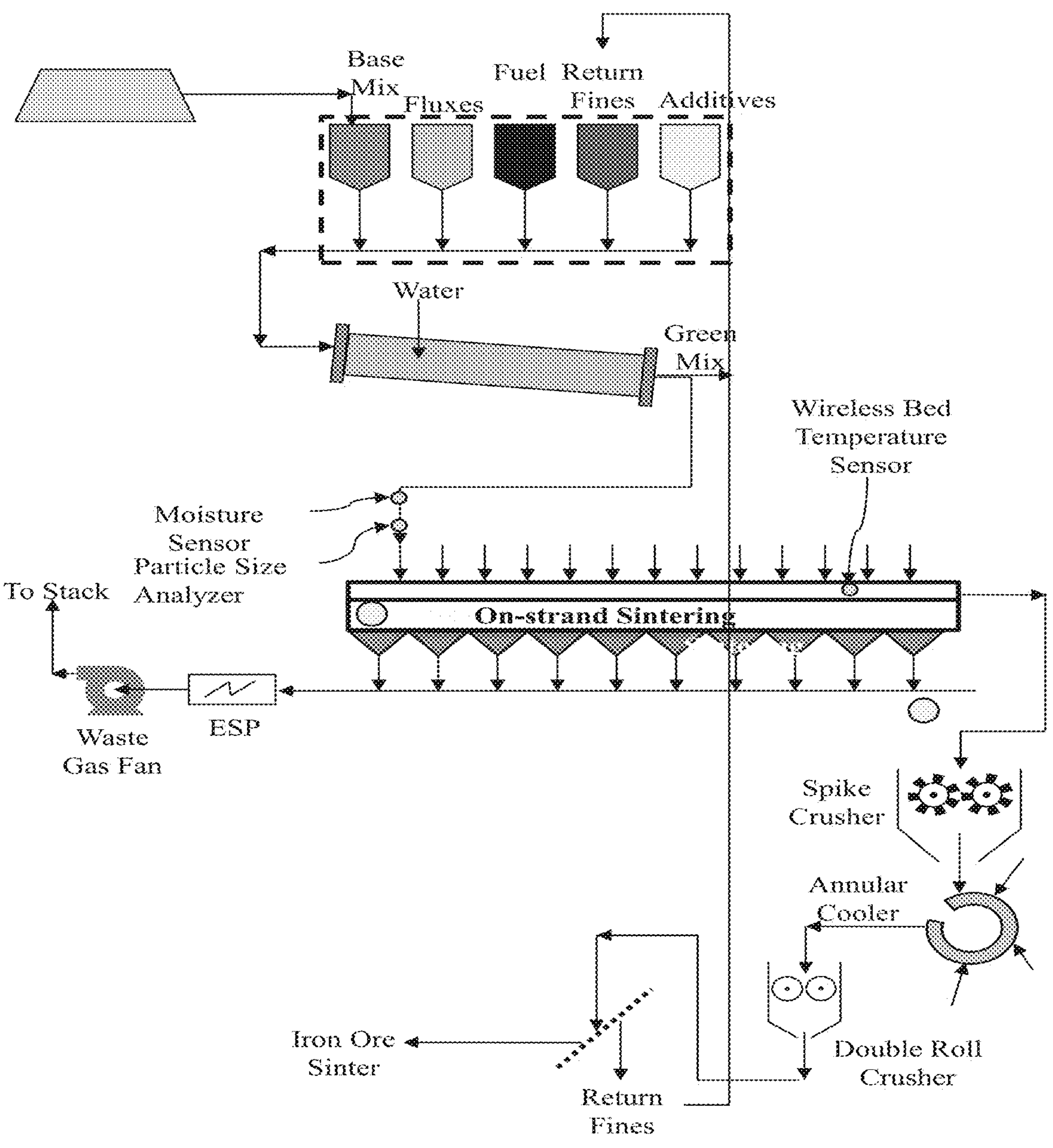
FIG. 6 is an example of a Sintering plant that can be monitored using the system of FIG. 1, according to some embodiments of the present disclosure.

FIG. 6 illustrates a process flow diagram of the complete sintering process. The raw material comprises the base mix (iron ore) from iron ore mines, mixed with solid fuel which is generally coke or coal as a mean for combustion, binder and additives for increasing the strength of the sinter quality, limestone for the attaining the desired sinter chemical composition and quality, and waste recovery material (like steel plant reverts) from other units. The raw material is stockpiled, sliced and fed to the granulation operation, which consist a rotating drum rotating at certain speed and water is continuously added to the drum in order to facilitate the nucleation process. In the presence of moisture, the finer particles are attached to the coarser particles and gives a narrower particle size distribution of wet particle with larger mean size. This mixture, also known as green mix, is further fed to the sintering operation which consists of a moving strand where thermo-chemical conversion of green mix takes part. The mixture is continuously fed at one end, ignited by means of burners and ignition is sustained by continuously applying differential pressure through multiple wind boxes below the strand. The green mix undergoes various thermal-chemical operations such as drying of moisture, combustion, calcination, melting and solidification on the sinter strand. As the mixture moves along the length of the strand, the flame front moves down and at one specific time it completely pass through the bed. This point is known as burn through point (BTP) and its estimation is crucial for optimal operation of the process. The ideal location of BTP is just before the end of strand as some time is required for cooling of the melt and solidification of the sintered product.

The sintered product discharged from the strand is crushed in crusher, in order to reduce the larger size of lumps. The product is then cooled gradually in an annular cooler to further reduce its temperature. The product is further crushed and screened. The product of desired size range is transported for further processing and the undersize product is fed back as part of feed material to granulation for better utilization and better plant efficiency.

The process parameters from the granulation such as water flow rate, proportions of solid feed materials, chemical composition of feed materials from laboratory measurement and process parameters from sintering such as strand speed, bed height, suction pressure, ignition hood temperatures wind box temperatures, etc. are fed to the PLC/DCS by the operators and their historical and current values may be retrieved from SCADA for further processing. This data can be utilized for prediction, simulation, monitoring and process optimization as well as utilized for self-learning maintaining the efficacy of various process models.

Technical Problem

The process models comprising the data-driven models and physics-based models of iron ore sintering plant are representative of the actual physical and chemical processes taking place in the plant. These process models can be used to provide real-time visibility and insight into the performance of granulation drum and sintering strand, and predicting and forecasting process KPIs such as productivity, fuel rate, percentage of undersize material, emissions, etc. and product quality parameters (tumbler index, abrasion index and reduction degradation index) in real-time. These models are trained (data-driven models) or calibrated (physics-based models) using historical operations and laboratory data of the sinter plant.

The performance of these models typically deteriorates with time due to the changes in the operating regime of the plant. The changes in operating regime may occur due to several factors such as change in feed material, wear and tear of process equipment, replacement/maintenance of process equipment, change in operating conditions, and change in control strategy or operating strategy. If the performance of the models degrades significantly, its need to be corrected in order to adapt to the newer operating regime.

A self-learning framework may be used for re-training or retuning the models based on the ground truth (actual measurements, laboratory test results, etc.) available for validating the models. The quality of ground truth data plays a crucial role in tuning the models and maintaining their effectiveness.

However, the ground truth is not always accurate. For example, the 2D CFD model of the sintering process is tuned and validated using the measured wind box temperature profiles as the ground truth. These are the temperature profile of flue gas emanating from the sinter strand and collected in windbox below the strand. The key performance indicator (KPIs) like BTP (Burn through point), Maximum windbox temperature and flame front parameters are some key variables derived from the wind box temperature profile which are true indicator of process working and efficiency. These work as real-time crucial feedback to the operator to get the process visibility and to determine the next set of suitable actions.

Often due to the wear and tear, inadequate maintenance and age of equipment, the wind box profiles become corrupted due to the ingression of air in windboxes. There is no measure of air ingression due to the unavailability of appropriate sensors, dynamic nature of air ingression and unknown location of leakage. This dynamic and complex nature of mixing of the air with the flue gas from the sintering strand leads to the noisy and corrupt ground truth data for the self-learning. The resultant self-learnt model will be corrupted due to learning on noisy ground truth and their accuracy will be low. Such process model doesn't effectively learn the underlying physical information of the process operating in the new operating regime.

Thus identifying and correcting the ground truth for use in adaptive learning is the technical challenge and current invention addresses this challenge. Additionally, quantification of the measure of inaccuracy or noise present in ground truth and providing the same as soft sensed information to plant operators will help them in proper diagnosis of the root cause analysis and enable predictive maintenance.

Another significant challenge with self-learning is effective data selection. Significant amount of historical data may be available for self-learning (e.g. few million instances) depending on the data sampling frequency and data storage capability at the plant. Since self-learning is inherently time consuming due to the fact that it is a parameter optimization problem, the use of large historical datasets in self-learning further increases the time taken for completion.

Therefore, it is necessary to select a smaller subset of historical data to accelerate self-learning so that is can be implemented in real-time at the plants. The selected subset should have:

1. Sufficient data to capture the full signature of original dataset
2. Sufficient variability to capture the dynamics of all process operating regimes
3. Not have the outliers that can corrupt the models.

Problem Addressed by the Invention

Figure 5:
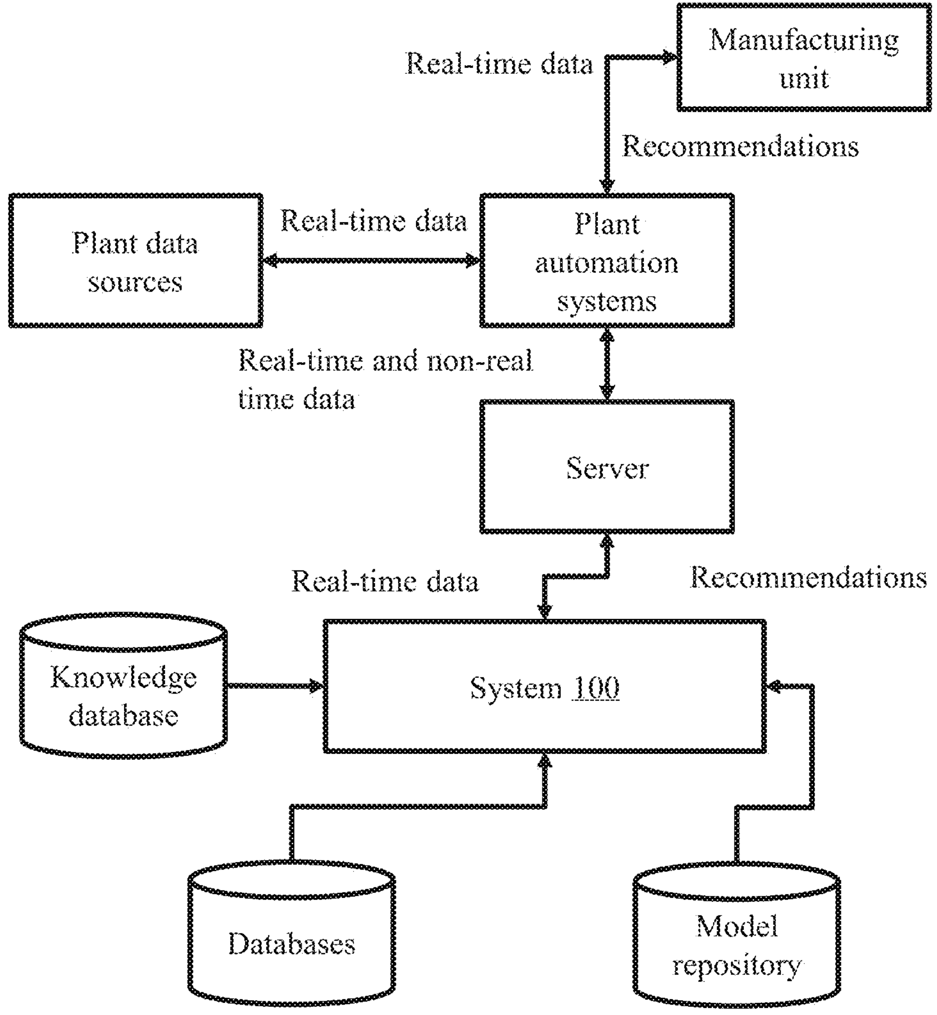
FIG. 5 is a functional flow diagram depicting an example implementation of the system of FIG. 1 in an industrial plant environment, according to some embodiments of the present disclosure.
Figure 7:
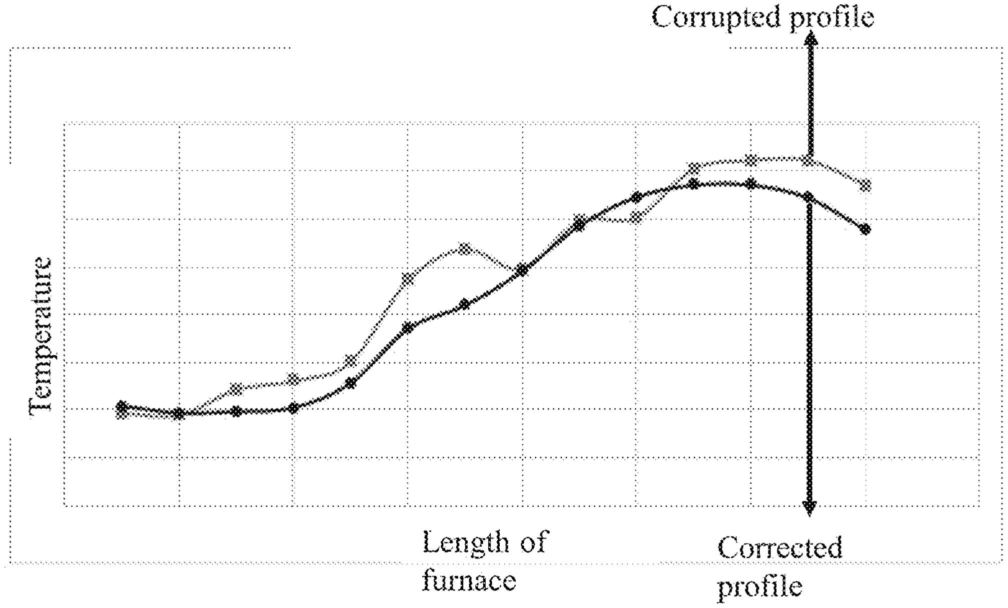
FIG. 7 is an example graphical plot depicting noise in a corrupted profile and a corrected profile respectively, according to some embodiments of the present disclosure.

To overcome the challenges mentioned above, the system 100 may be deployed to monitor the plant as depicted in FIG. 5. The system 100 improves the accuracy and robustness of adaptive learning process. In the practical implementation scenario depicted in FIG. 5, the system 100 may be implemented as a combination of a profile deviation detection module (PDM) and a profile correction and selection module (PCS). The profile deviation detection module (PDM) checks if there is any significant distortion in the ground truth profile. The profile correction and selection module (PCS) may further consist, 2 separate modules which is profile correction module (PCM) and instance selection module (ISM). The profile correction module performs the ground truth profile correction method as depicted in FIG. 3, to correct the windbox temperature profiles using both the underlying physics and actual measured profiles. For a given measured windbox profile, the key statistical information is extracted from the measured data. Also based on the operating condition, a signature profile is selected from the database and/or literature. The signature profile is approximated as a normal distribution using one or more normal distribution. The parameters of the functional form such as variance and amplitude are given a functional form based on the underlying variation of physical properties of the feed. The previously calculated statistical attribute is used in fitting the functional form of the distribution and parameters. This gives the corrected ground truth profile. Such corrected ground truth profiles have shown to improve the self-learning accuracy. The plot in FIG. 7 depicts the inaccurate measured ground truth profile and corresponding corrected ground truth profile of gas furnace from the sinter plant. From FIG. 7, it can be clearly seen that there is very less noise in the corrected ground truth profile.

The signature profile represents the true underlying ground truth profile. The dissimilarity between the signature profile and the measured ground truth profile may be quantified and soft sensed to the operator for further diagnosis and maintenance purposes.

An instance selection module, which is an implementation of the system 100 of FIG. 1, may perform a similarity-based approach for subsetting the data. Based on the similarity between the signature profile and the actual profile, the original dataset is sorted into finite number of bins. The subset of the data is then selected randomly from each individual bin except from the extreme bin in a proportional fraction of original data set. Such data selection strategy maintains the similarity profile of original data set and removes the outliers. This in turn helps in maintaining the generic nature of self-learning of the process models.

Figure 8A:
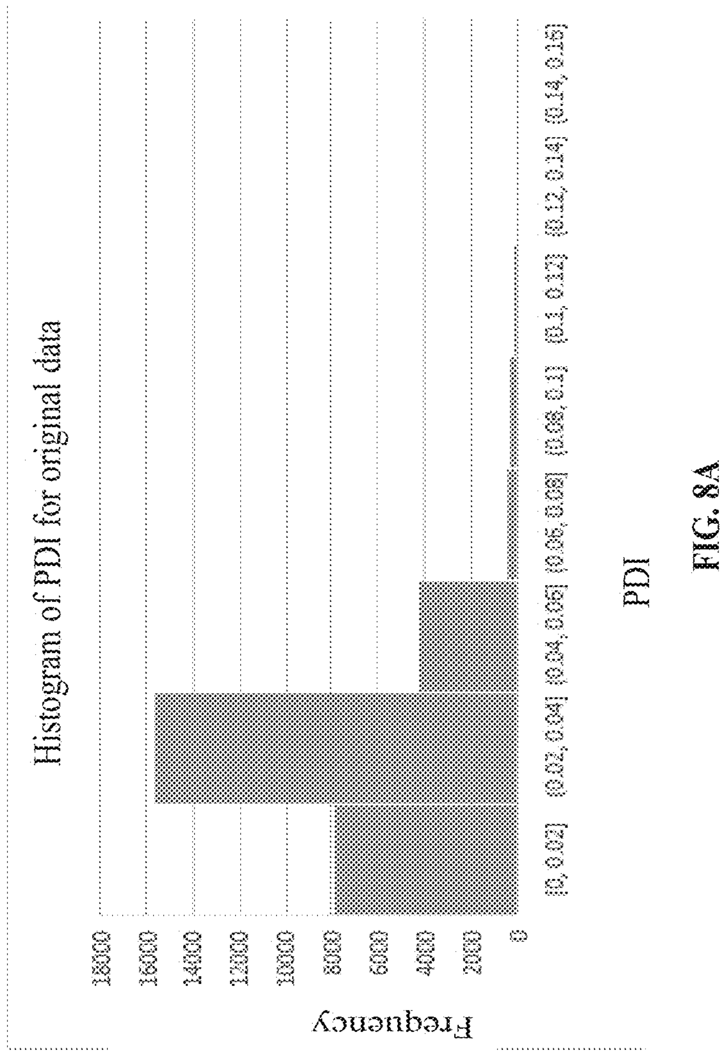
FIGS. 8A and 8B depict examples of instance selection being performed by the system of FIG. 1, according to some embodiments of the present disclosure.
Figure 8B:
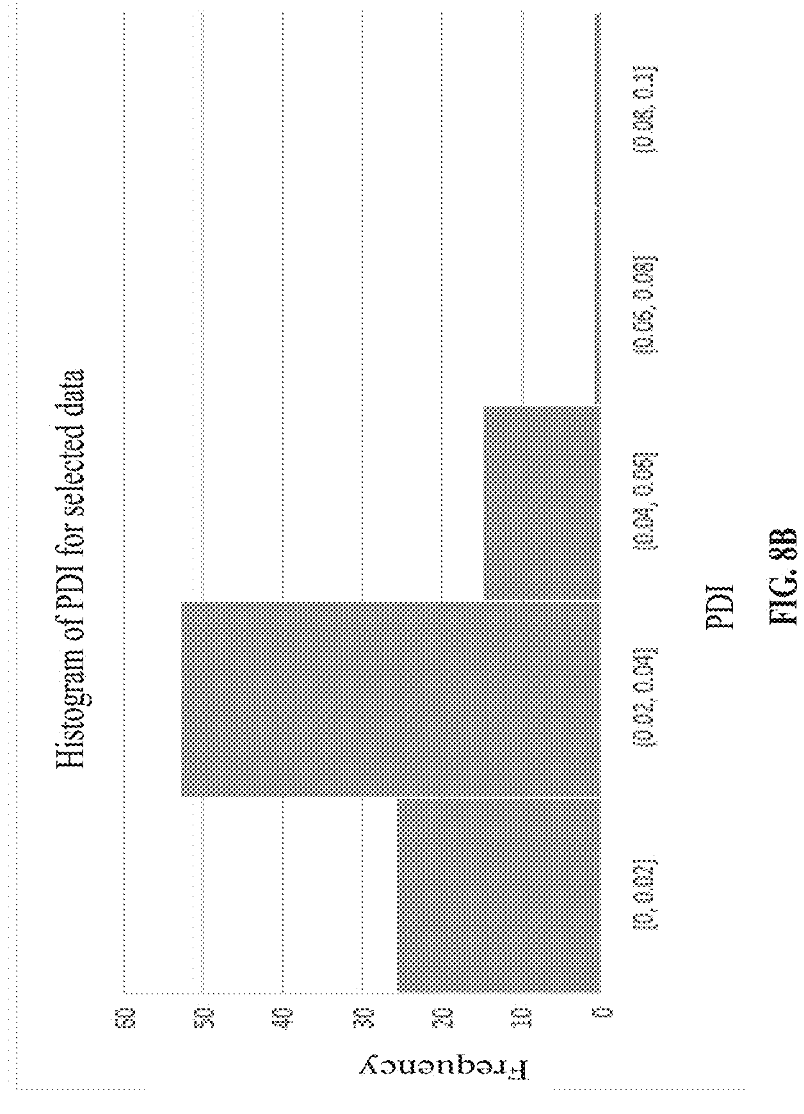

An example of instance selection step is shown in FIGS. 8A and 8B. FIG. 8A depicts distribution of instances across the bins based on PDI values for original dataset. FIG. 8B depicts the selected limited instances from the larger dataset.

It is evident from the figures that the data distribution is maintained, thus ensuring generalizability of the learnt process models.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of accuracy improvement of ground truth data being used for applications such as data-driven model generation and retuning of data-driven and physics-based models in manufacturing systems. The embodiment thus provides a method and system for ground truth profile correction. Moreover, the embodiments herein further provide a mechanism for selecting appropriate instances of ground truth profiles for effective use in various applications.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method of adaptive learning of models for a manufacturing system, comprising:

collecting a plurality of measured ground truth profiles and operating data as input data, via one or more hardware processors, from one or more databases at a pre-determined frequency, wherein each of the plurality of the measured ground truth profiles comprises information on one or more manufacturing system parameters and one or more variables corresponding to each of the one or more manufacturing system parameters;

pre-processing the input data, via the one or more hardware processors, wherein the pre-processing of the input data comprises conditioning the input data to satisfy one or more pre-defined data quality requirements;

obtaining, via the one or more hardware processors, simulated data based on the pre-processed data using soft sensors, wherein the soft sensors comprise a physics-based soft sensor and a data-driven soft sensor, wherein the simulated data is integrated with pre-processed data to obtain integrated data;

determining a Profile Deviation Index (PDI) value for each of the plurality of the measured ground truth profiles in the integrated data, via the one or more hardware processors, wherein the PDI value represents a quantified distortion in each of the plurality of the measured ground truth profiles, wherein the determined PDI value of each of the measured ground truth profiles is displayed using an Input/Output interface;

comparing the PDI value of each of the plurality of the measured ground truth profiles with a threshold of distortion, via the one or more hardware processors, wherein the PDI value exceeding the threshold of distortion for any of the plurality of the measured ground truth profiles indicates inaccuracy in the measured ground truth profile;

performing a ground truth profile correction for all measured ground truth profiles from among the plurality of the measured ground truth profiles for which the PDI value exceeds the threshold of distortion, via the one or more hardware processors, wherein the ground truth profile correction is iteratively performed until the PDI value is below the threshold of distortion, wherein performing the ground truth profile correction comprises:

obtaining a plurality of statistical attributes of each of the plurality of the measured ground truth profiles;

determining a functional form of standard deviation and amplitude for each of the plurality of the measured ground truth profiles, based on an underlying physical characteristic of the one or more manufacturing system parameters, wherein the functional form is determined as:

$$f_{[[\sigma]]}(x) = \sigma\left(\frac{\lambda_\sigma}{e^{-\alpha(x-\mu)}+1}+1\right) \text{ and}$$

$$f_K(x) = K\left(\frac{\lambda_K}{e^{-\alpha(x-\mu)}+1}+1\right)$$

where, f(x) and $f_K(x)$ represent the functional forms of standard deviation and maximum amplitude respectively, $\alpha$ is rate parameter, $\mu$ is a mean, K is the maximum amplitude, and $\lambda_\sigma$, $\lambda_K$ are transition factors;

approximating a selected signature profile corresponding to each of the plurality of the measured ground truth profiles, using one or more normal distributions, wherein the functional form of the approximated signature profile is $$f(x) = \sum_{i=1}^{n} \mathcal{N}\left(\mu_i, \sigma_i^2\right)$$

$$\mathcal{N}\left(\mu_i, \sigma_i^2\right) = B_i + \frac{K_i(x)}{\sigma_i(x)\sqrt{2\pi}} e^{\frac{-1}{2}\left(\frac{x-\mu_i}{\sigma_i(x)}\right)^2}\Big),$$

where, $\sigma$ is standard deviation

B is bias; and obtaining a corrected ground truth profile by using the approximated signature profile, the obtained statistical attributes, the determined functional forms of the standard deviation and the amplitude, and an operating condition of the manufacturing system;

performing an instance selection, via the one or more hardware processors, wherein performing the instance selection comprises selecting a plurality of instances of data from among the plurality of the measured ground truth profiles, after performing the ground truth profile correction, wherein each of the plurality of instances of data is a subset of the plurality of the measured ground truth profiles, wherein selecting each of the plurality of instances comprises:

determining the PDI value for each of the measured ground truth profiles that did not require correction and the PDI value is reused instead of recalculating, and for each of the obtained corrected ground truth profiles, with corresponding signature profile;

obtaining a frequency distribution of the determined PDIs using a plurality of bins, wherein the frequency distribution indicates a percentage of the ground truth profiles lying in each bin for an original dataset;

comparing the determined PDIs with a pre-determined threshold of PDI, wherein the determined PDIs exceeding the threshold of PDI for any bin are identified as outlier ground truth profiles and discarding the identified outlier ground truth profiles reduces amount of data being processed, reduces storage space and overhead in processing the instances of data; and performing random sampling of the ground truth profiles from each of the plurality of bins, other than the discarded outlier ground truth profiles, based on the distribution of the measured ground truth profiles across the plurality of bins;

retuning at least one of a data-driven model and a physics-based model using the plurality of selected instances and the integrated data, via the one or more hardware processors, wherein performing the ground truth profile correction and selecting instances of data dynamically for retuning of the physics-based model and the data-driven model facilitate adaptive learning of models for the manufacturing system; and deploying the physics-based model and the data-driven model in an iron ore sintering plant and correcting windbox temperature profiles with combination of the physics-based model and the measured ground truth profiles.

2. The method of claim 1, wherein determining the PDI value for each of the plurality of the measured ground truth profiles comprises:

selecting a signature profile corresponding to each of the plurality of the measured ground truth profiles, from a signature profile database, based on operating conditions of the manufacturing system; and determining the PDI value based on a computed similarity metric and an error metric between the signature profile and the measured ground truth profile.

3. The method of claim 2, wherein the similarity metric comprises one or more of cosine similarity, or dynamic time warping (DTW).

4. The method of claim 2, wherein the error metric comprises one or more of Mean Square Error (MSE), Root Mean Square Error (RMSE), and Mean Absolute Percentage Error (MAPE).

5. The method of claim 1, wherein the conditioning of the input data comprises one or more of a) identification and removal of outliers, b) imputation of missing data, and c) synchronization and integration of a plurality of variables from one or more databases.

6. The method of claim 1, wherein during the iron ore sintering operation, physico-chemical properties including a heat capacity, a conductivity of a green mix varies throughout a sintering strand and affecting windbox profiles beneath, and variations are captured with the function form of the standard deviation and the amplitude for fitting a signature profile.

7. The method of claim 1, wherein the method further comprises monitoring performance of a coal-fired boiler, the ground truth profile include information on the manufacturing system parameters including a temperature, a pressure and the variables corresponds to factors that affect each of the manufacturing system parameters including types and amounts of raw materials being used in the coal-fired boiler, characteristics such as composition, size distribution of each of the raw materials, plant operating conditions such as temperature and pressure of the raw materials, number of burners in use, and valve openings.

8. A system for adaptive learning of models for manufacturing systems, comprising:

a memory storing a plurality of executable instructions;

a communication interface; and one or more hardware processors operatively coupled to the memory via the communication interface, wherein the one or more hardware processors are configured by the plurality of executable instructions to:

collect a plurality of measured ground truth profiles and operating data as input data, from one or more databases at a pre-determined frequency, wherein each of the plurality of the measured ground truth profiles comprises information on one or more manufacturing system parameters and one or more variables corresponding to each of the one or more manufacturing system parameters;

pre-process the input data, wherein the pre-processing of the input data comprises conditioning the input data to satisfy one or more pre-defined data quality requirements;

obtain simulated data based on the pre-processed data using soft sensors, wherein the soft sensors comprise a physics-based soft sensor and a data-driven soft sensor, wherein the simulated data is integrated with pre-processed data to obtain integrated data;

determine a Profile Deviation Index (PDI) value for each of the plurality of the measured ground truth profiles in the integrated data, wherein the PDI value represents a quantified distortion in each of the plurality of the measured ground truth profiles, wherein the determined PDI value of each of the measured ground truth profiles is displayed using an Input/Output interface;

compare the PDI value of each of the plurality of the measured ground truth profiles with a threshold of distortion, wherein the PDI value exceeding the threshold of distortion for any of the plurality of the measured ground truth profiles indicates inaccuracy in the measured ground truth profile;

perform a ground truth profile correction for all measured ground truth profiles from among the plurality of the measured ground truth profiles for which the PDI value exceeds the threshold of distortion, wherein the ground truth profile correction is iteratively performed until the PDI value is below the threshold of distortion, wherein the system performs the ground truth profile correction by:

obtaining a plurality of statistical attributes of each of the plurality of the measured ground truth profiles;

determining a functional form of a standard deviation and an amplitude for each of the plurality of the measured ground truth profiles, based on an underlying physical characteristic of the one or more manufacturing system parameters, wherein the functional form is determined as:

$$f_{[[\sigma]]}(x) = \sigma\left(\frac{\lambda_\sigma}{e^{-\alpha(x-\mu)}+1}+1\right) \text{ and}$$

$$f_K(x) = K\left(\frac{\lambda_K}{e^{-\alpha(x-\mu)}+1}+1\right)$$

where, f(x) and $f_K(x)$ represent the functional forms of standard deviation and maximum amplitude respectively, $\alpha$ is rate parameter, $\mu$ is a mean, K is the maximum amplitude, and $\lambda_\sigma$, $\lambda_K$ are transition factors;

approximating a selected signature profile corresponding to each of the plurality of the measured ground truth profiles, using one or more normal distributions, wherein the functional form of the approximated signature profile is $$f(x) = \sum_{i=1}^{n} \mathcal{N}(\mu_i, \sigma_i^2)$$

$$\mathcal{N}(\mu_i, \sigma_i^2) = B_i + \frac{K_i(x)}{\sigma_i(x)\sqrt{2\pi}} e^{\frac{-1}{2}\left(\frac{x-\mu_i}{\sigma_i(x)}\right)^2}\Bigg),$$

where, $\sigma$ is standard deviation

B is bias; and obtaining a corrected ground truth profile by using the approximated signature profile, the obtained statistical attributes, the determined functional forms of the standard deviation and the amplitude, and an operating condition of the manufacturing system;

perform an instance selection, wherein performing the instance selection comprises selecting a plurality of instances of data from among the plurality of the measured ground truth profiles, after performing the ground truth profile correction, wherein each of the plurality of instances of data is a subset of the plurality of the measured ground truth profiles, wherein the system selects each of the plurality of instances by:

determining the PDI value for each of the measured ground truth profiles that did not require correction and the PDI value is reused instead of recalculating, and for each of the obtained corrected ground truth profiles, with corresponding signature profile;

obtaining a frequency distribution of the determined PDIs using a plurality of bins, wherein the frequency distribution indicates a percentage of the ground truth profiles lying in each bin for an original dataset;

comparing the determined PDIs with a pre-determined threshold of PDI, wherein the determined PDIs exceeding the threshold of PDI for any bin are identified as outlier ground truth profiles and discarding the identified outlier ground truth profiles reduces amount of data being processed, reduces storage space and overhead in processing the instances of data; and performing random sampling of the ground truth profiles from each of the plurality of bins, other than the discarded outlier ground truth profiles, based on the distribution of the measured ground truth profiles across the plurality of bins;

retune at least one of a data-driven model and a physics-based model using the plurality of selected instances and the integrated data, wherein performing the ground truth profile correction and selecting instances of data dynamically for retuning of the physics-based model and the data-driven model facilitate adaptive learning of models for the manufacturing system; and deploy the physics-based model and the data-driven model in an iron ore sintering plant and correcting windbox temperature profiles with combination of the physics-based model and the measured ground truth profiles.

9. The system of claim 8, wherein the system determines the PDI value for each of the plurality of the measured ground truth profiles by:

selecting a signature profile corresponding to each of the plurality of the measured ground truth profiles, from a signature profile database, based on operating conditions of the manufacturing system; and determining the PDI value based on a computed similarity metric and an error metric between the signature profile and the measured ground truth profile.

10. The system of claim 9, wherein the similarity metric comprises one or more of cosine similarity, or dynamic time warping (DTW).

11. The system of claim 9, wherein the system uses one or more of a Mean Square Error (MSE), a Root Mean Square Error (RMSE), and a Mean Absolute Percentage Error (MAPE), as the error metric.

12. The system of claim 8, wherein the system performs the conditioning of the input data by performing one or more of a) identification and removal of outliers, b) imputation of missing data, and c) synchronization and integration of a plurality of variables from one or more databases.

13. The system of claim 8, wherein during the iron ore sintering operation, physico-chemical properties including a heat capacity, a conductivity of a green mix varies throughout a sintering strand and affecting windbox profiles beneath, and variations are captured with the function form of the standard deviation and the amplitude for fitting a signature profile.

14. The system of claim 8, wherein the system is further configured to monitor performance of a coal-fired boiler, the ground truth profile include information on the manufacturing system parameters including a temperature, a pressure and the variables corresponds to factors that affect each of the manufacturing system parameters including types and amounts of raw materials being used in the coal-fired boiler, characteristics such as composition, size distribution of each of the raw materials, plant operating conditions such as temperature and pressure of the raw materials, number of burners in use, and valve openings.

15. One or more non-transitory machine-readable information storage mediums comprising one or more instructions which when executed by one or more hardware processors cause:

collecting a plurality of measured ground truth profiles and operating data as input data, from one or more databases at a pre-determined frequency, wherein each of the plurality of the measured ground truth profiles comprises information on one or more manufacturing system parameters and one or more variables corresponding to each of the one or more manufacturing system parameters;

pre-processing the input data, via the one or more hardware processors, wherein the pre-processing of the input data comprises conditioning the input data to satisfy one or more pre-defined data quality requirements;

obtaining, via the one or more hardware processors, simulated data based on the pre-processed data using soft sensors, wherein the soft sensors comprise a physics-based soft sensor and a data-driven soft sensor, wherein the simulated data is integrated with pre-processed data to obtain integrated data;

determining a Profile Deviation Index (PDI) value for each of the plurality of the measured ground truth profiles in the integrated data, via the one or more hardware processors, wherein the PDI value represents a quantified distortion in each of the plurality of the measured ground truth profiles, wherein the determined PDI value of each of the measured ground truth profiles is displayed using an Input/Output interface;

comparing the PDI value of each of the plurality of the measured ground truth profiles with a threshold of distortion, via the one or more hardware processors, wherein the PDI value exceeding the threshold of distortion for any of the plurality of the measured ground truth profiles indicates inaccuracy in the measured ground truth profile;

performing a ground truth profile correction for all measured ground truth profiles from among the plurality of the measured ground truth profiles for which the PDI value exceeds the threshold of distortion, via the one or more hardware processors, wherein the ground truth profile correction is iteratively performed until the PDI value is below the threshold of distortion, wherein performing the ground truth profile correction comprises:

obtaining a plurality of statistical attributes of each of the plurality of the measured ground truth profiles;

determining a functional form of standard deviation and amplitude for each of the plurality of the measured ground truth profiles, based on an underlying physical characteristic of the one or more manufacturing system parameters, wherein the functional form is determined as:

$$f_{[[\sigma]]}(x) = \sigma\left(\frac{\lambda_\sigma}{e^{-\alpha(x-\mu)}+1}+1\right) \text{ and}$$

$$f_K(x) = K\left(\frac{\lambda_K}{e^{-\alpha(x-\mu)}+1}+1\right)$$

where, f(x) and $f_K(x)$ represent the functional forms of standard deviation and maximum amplitude respectively, $\alpha$ is rate parameter, $\mu$ is a mean, K is the maximum amplitude, and $\lambda_\sigma$, $\lambda_K$ are transition factors;

approximating a selected signature profile corresponding to each of the plurality of the measured ground truth profiles, using one or more normal distributions, wherein the functional form of the approximated signature profile is $$f(x) = \sum_{i=1}^{n} N(\mu_i, \sigma_i^2)$$

$$N(\mu_i, \sigma_i^2) = B_i + \frac{K_i(x)}{\sigma_i(x)\sqrt{2\pi}} e^{\frac{-1}{2}\left(\frac{x-\mu_i}{\sigma_i(x)}\right)^2}),$$

where, $\sigma$ is standard deviation

B is bias; and obtaining a corrected ground truth profile by using the approximated signature profile, the obtained statistical attributes, the determined functional forms of the standard deviation and the amplitude, and an operating condition of the manufacturing system;

performing an instance selection, via the one or more hardware processors, wherein performing the instance selection comprises selecting a plurality of instances of data from among the plurality of the measured ground truth profiles, after performing the ground truth profile correction, wherein each of the plurality of instances of data is a subset of the plurality of the measured ground truth profiles, wherein selecting each of the plurality of instances comprises:

determining the PDI value for each of the measured ground truth profiles that did not require correction and the PDI value is reused instead of recalculating, and for each of the obtained corrected ground truth profiles, with corresponding signature profile;

obtaining a frequency distribution of the determined PDIs using a plurality of bins, wherein the frequency distribution indicates a percentage of the ground truth profiles lying in each bin for an original dataset;

comparing the determined PDIs with a pre-determined threshold of PDI, wherein the determined PDIs exceeding the threshold of PDI for any bin are identified as outlier ground truth profiles and discarding the identified outlier ground truth profiles reduces amount of data being processed, reduces storage space and overhead in processing the instances of data; and performing random sampling of the ground truth profiles from each of the plurality of bins, other than the discarded outlier ground truth profiles, based on the distribution of the measured ground truth profiles across the plurality of bins;

retuning at least one of a data-driven model and a physics-based model using the plurality of selected instances and the integrated data, via the one or more hardware processors, wherein performing the ground truth profile correction and selecting instances of data dynamically for retuning of the physics-based model and the data-driven model facilitate adaptive learning of models for the manufacturing system; and deploying the physics-based model and the data-driven model in an iron ore sintering plant and correcting windbox temperature profiles with combination of the physics-based model and the measured ground truth profiles.

16. The one or more non-transitory machine-readable information storage mediums of claim 15, wherein determining the PDI value for each of the plurality of the measured ground truth profiles comprises:

selecting a signature profile corresponding to each of the plurality of the measured ground truth profiles, from a signature profile database, based on operating conditions of the manufacturing system; and determining the PDI value based on a computed similarity metric and an error metric between the signature profile and the measured ground truth profile.

17. The one or more non-transitory machine-readable information storage mediums of claim 16, wherein the similarity metric comprises one or more of cosine similarity, or dynamic time warping (DTW).

18. The one or more non-transitory machine-readable information storage mediums of claim 16, wherein the error metric comprises one or more of Mean Square Error (MSE), Root Mean Square Error (RMSE), and Mean Absolute Percentage Error (MAPE).

19. The one or more non-transitory machine-readable information storage mediums of claim 15, wherein the conditioning of the input data comprises one or more of a) identification and removal of outliers, b) imputation of missing data, and c) synchronization and integration of a plurality of variables from one or more databases.

20. The one or more non-transitory machine-readable information storage mediums of claim 15, wherein during the iron ore sintering operation, physico-chemical properties including a heat capacity, a conductivity of a green mix varies throughout a sintering strand and affecting windbox profiles beneath, and variations are captured with the function form of the standard deviation and the amplitude for fitting a signature profile.

* * * * *